Dec. 30, 1958 C. GERST 2,866,350
TRANSMISSION
Filed Feb. 13, 1956 5 Sheets-Sheet 1

INVENTOR.
Chris Gerst
BY
E. J. Balluff
ATTORNEY

Dec. 30, 1958     C. GERST     2,866,350

TRANSMISSION

Filed Feb. 13, 1956     5 Sheets-Sheet 4

INVENTOR.
Chris Gerst
BY
ATTORNEY

Dec. 30, 1958 C. GERST 2,866,350
TRANSMISSION
Filed Feb. 13, 1956 5 Sheets-Sheet 5

INVENTOR.
Chris Gerst.
BY
E. J. Ballauff
ATTORNEY

United States Patent Office 2,866,350
Patented Dec. 30, 1958

2,866,350

TRANSMISSION

Chris Gerst, Detroit, Mich., assignor to The Transmission & Gear Company, Dearborn, Mich., a corporation of Michigan Application February 13, 1956, Serial No. 565,148

10 Claims. (Cl. 74—360)

This invention relates to transmissions and has particular reference to a steering axle and transmission assembly for use with a tractor or the like.

The invention contemplates an improved steering axle and transmission assembly having provisions for driving a power-operated device such as a winch from one of the transmission shafts, the arrangement being such that the winch may be driven in either direction at a selected speed in accordance with the transmission setting. The transmission itself consists essentially of an input shaft and a main clutch shaft with selectively operable multi-speed gearing and forward and reverse clutch means for driving the clutch shaft either forwardly or reversely at a selected speed, a pair of counter shafts driven from the clutch shaft and having high and low speed gears thereon, a pair of output shafts each geared to the high and low speed gears on one of the countershafts, and selectively operable high and low speed clutches for driving the output shafts from the countershafts in a selected speed ratio. The various clutches are selectively operable so that both output shafts may be driven forwardly or reversely at different speeds or at the same speed, or each output shaft may be driven in either direction at a selected speed while the other output shaft remains idle. The power-driven winch is adapted to be coupled with one of the countershafts of the transmission so that the winch may be driven independently of rotation of the driveshafts or may be driven therewith if desired.

A principal object of the invention is to provide an improved steering axle and transmission assembly.

Another object of the invention is to provide a power transmission including a power take-off shaft for operating a winch or the like.

Other and further objects of the invention will be apparent from the following description and claims and may be understood by reference to the accompanying drawings, of which there are five sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 6 is an elevational view of one end of the transmission with parts broken away; and Fig. 7 is a fragmentary sectional view of one of the clutches employed in the transmission.

Referring more particularly to the drawings, the steering axle and transmission assembly includes a transmission housing 10 which is generally symmetrical with respect to the input shaft 12 of the transmission which is adapted to be connected by a universal joint, a portion of which is shown at 14, to a propeller shaft which is driven from the engine of the tractor through a torque converter, the engine and torque converter not being illustrated herein. The transmission includes a pair of output shafts 16R and 16L at its opposite ends with the output shafts disposed transversely to the input shaft 12 and drive wheels or sprockets 18R and 18L secured on the outer end of the output shafts so that the drive sprockets 18R and 18L will be driven with the output shafts. The sprockets may comprise the drive sprockets for a crawler type tractor or may comprise the drive wheels of a tractor.

Figure 1:
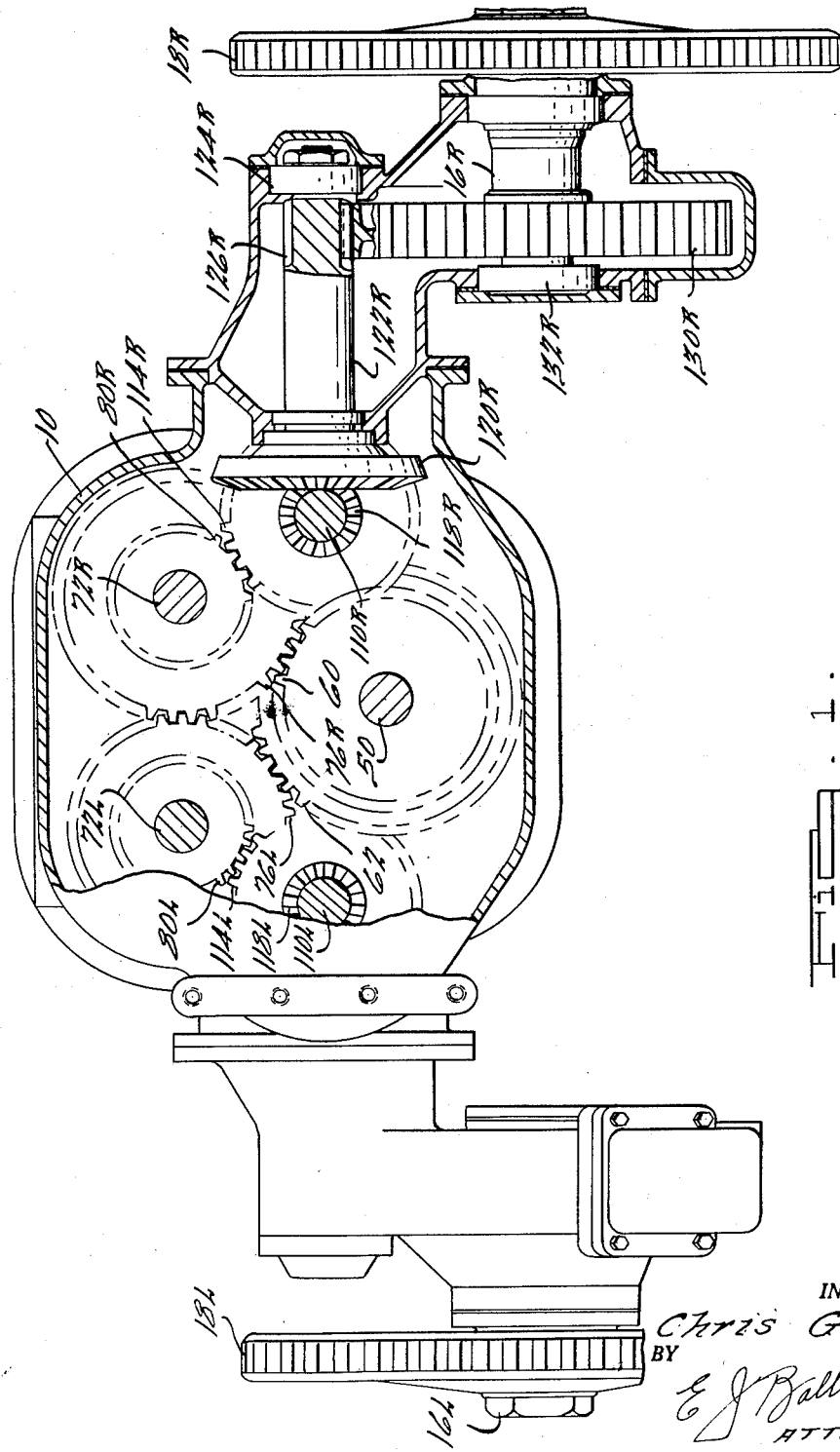
Fig. 1 is an elevational view partly in section of the improved axle and transmission assembly.
Figure 2:
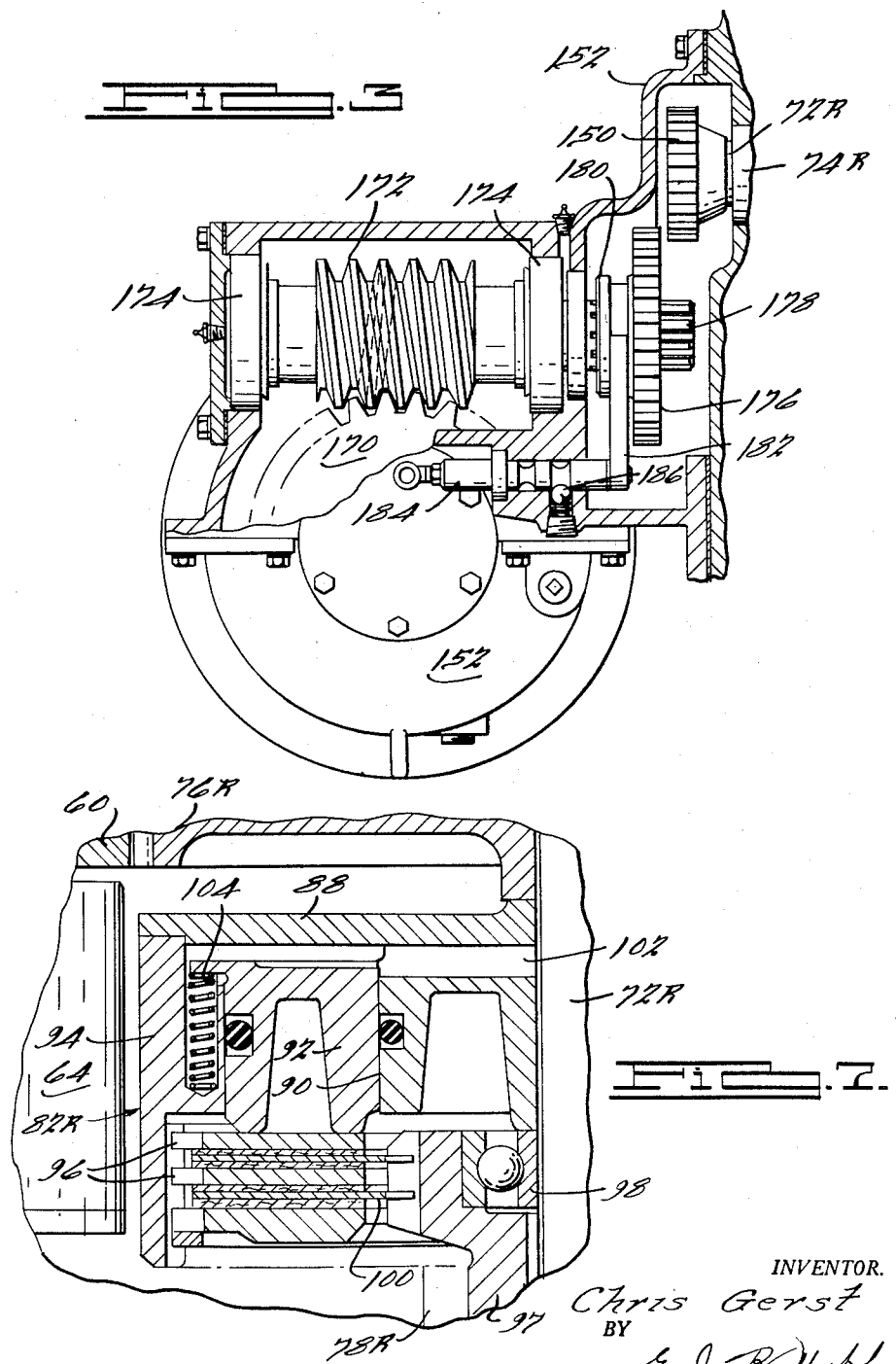
Fig. 2 is a horizontal sectional partially developed view of one-half of the transmission.

The input shaft 12 is journaled in a bearing 20 in an end wall 22 of the transmission housing 10 and a clutch element 24 is slidably splined onto input shaft 12 for rotation therewith. A gear 26 is rotatably journaled on input shaft 12 and includes a splined portion 28 adapted to receive the internal splines on the clutch element 24 when such clutch element is shifted axially in one direction along the input shaft. The clutch includes a shifter yoke 30 secured on a shifting lever 32 and cooperable with opposed shoulders on the clutch element 24 for shifting the clutch element in either direction along shaft 12. The clutch element is shown in its neutral position in Fig. 2, and a spring-pressed ball 34 cooperates with the shifting lever 32 to retain the yoke 30 and the clutch element in a selected axial position. A double gear 36 is journaled in the transmission housing by bearings 38 and 40, and one gear 42 thereof is meshed with gear 26 while the other gear 44 of the double gear is meshed with a gear 48 which is rotatably journaled on the input shaft 12 but has a splined connection with a clutch shaft 50 which is journaled in the transmisison by bearings 52 and 54. The gear 48 includes a splined portion 56 which is also adapted to receive the internal splines on clutch element 24. When the clutch lever 32 is shifted to couple gear 26 to the clutch member 24 which is driven with the input shaft, gear 26 will be clutched to the input shaft and gear 36 will be driven therewith so as to drive gear 48 from gear 44 to drive the clutch shaft 50 from the input shaft 12. When the clutch element 24 is shifted in the opposite direction to couple gear 48 to input shaft 12, the clutch shaft 50 will be driven with the input shaft 12 at a different speed ratio.

The clutch shaft 50 has a forward drive gear 60 rotatable thereon and a reverse drive gear 62, also rotatably journaled thereon. A fluid-pressure actuated clutch 64 of the multiple disc type is mounted on clutch shaft 50 and, when engaged, is adapted to couple forward drive gear 60 to clutch shaft 50. A similar clutch 66 provides a reverse drive clutch and when engaged is adapted to couple drive gear 62 to clutch shaft 50. The clutches 64 and 66 are hydraulically operated and are supplied with pressure fluid through lines 68 and 70 which communicate with axial passages in the clutch shaft 50.

The remainder of the transmission is substantially symmetrical and therefore only one-half of the transmission has been illustrated in detail. In the description of the remaining portion of the transmission, the reference characters will be followed by the letters R or L to denote that for each right-hand part illustrated and described there is a corresponding left-hand part symmetrically arranged relative to the input shaft. A pair of countershafts 72R and 72L are disposed parallel to clutch shaft 50 and are journaled in the opposing walls of housing 10 by bearings 74R and 74L. The countershaft 72R has a driven gear 76R secured thereon and meshed with forward drive gear 60. The countershaft 72L has a driven gear 76L secured thereon and meshed with reverse drive gear 62. The driven gears 76R and 76L are meshed with each other so that countershafts 72R and 72L will both be driven when either of the clutches 64 or 66 are engaged to couple one of the drive gears 60 or 62 to the clutch shaft 50.

The countershafts 72R and 72L have low speed gears 78R and 78L journaled thereon and high speed gears 80R and 80L rotatably journaled on their other ends. Low speed clutches 82R and 82L and high speed clutches 84R and 84L are mounted on the countershafts. The clutches 82 and 84 may be similar to the forward and reverse clutches, and a portion of clutch 82R is illustrated in Fig. 7 from which it will be seen that the clutch comprises a part 88 splined onto countershaft 72R and rotatable therewith. The driving clutch part 88 is formed to provide an annular cylinder 90 within which is disposed an annular piston 92. The driving clutch part includes a clutch carrier element 94 carrying a series of annular axially slidable clutch plates 96 opposite piston 92. The driven clutch part 97 is rotatably journaled on shaft 72R by a bearing 98 and carries a series of axially slidable, nonrotatable friction clutch plates 100 disposed between the driven plates 96. Hydraulic fluid is supplied through passage 102 into the space behind piston 92 so as to force the piston against the adjacent clutch plate 96 to compress the latter against the friction lining on clutch elements 100 so as to drive the driven part 97 with the countershaft 72R. A series of springs 104 react between an annular flange on piston 92 and the carrier 94 so as to disengage the clutch when the fluid pressure is reduced. The forward and reverse clutches 64 and 66 and the high and low speed clutches 84 and 82 R and L may be of similar construction.

The gear 78R is integral with or connected to the driven clutch part 97 and high speed gear 80R is integral with or connected to the driven part of the clutch 84R. The hydraulic controls for the clutches are under the control of the operator of the tractor, and both the high and low speed clutches 84R and 82R cannot be engaged at the same time but are selectably operable for coupling high speed gear 80R or low speed gear 78R to the countershaft 72R.

A second pair of shafts 110R and 110L are journaled in transmission housing 10 by bearings 112. Shaft 110R has a gear 114R secured thereon and meshed with high speed gear 80R and has a larger gear 116R secured thereon and meshed with low speed gear 78R so that shaft 110R will be driven at a selected speed from countershaft 72R upon engagement of one of the clutches 82R or 84R. A bevel gear 118R secured on shaft 110R is meshed with a bevel gear 120R secured on a transverse shaft 122R journaled in bearings 124R. The other end of shaft 122R has gear teeth 126R formed thereon and meshed with the teeth of a gear 130R splined onto output shaft 16R which is journaled in bearings 132R in the transmission 10.

A brake 134R is mounted on one end of shaft 110R and includes an outer rotating part 136R splined onto the end of shaft 110R and a fixed brake part 138R. The brake is adapted to be hydraulically actuated and includes suitable friction lining cooperable with a brake band formed on the rotatable part for holding the same and the shaft 110R against rotation when the brake is energized. Since the drive sprockets are connected to the shafts 110R and 110L through the gearing described, the drive sprockets or wheels may be braked by the brakes 134R and L.

Figure 3:
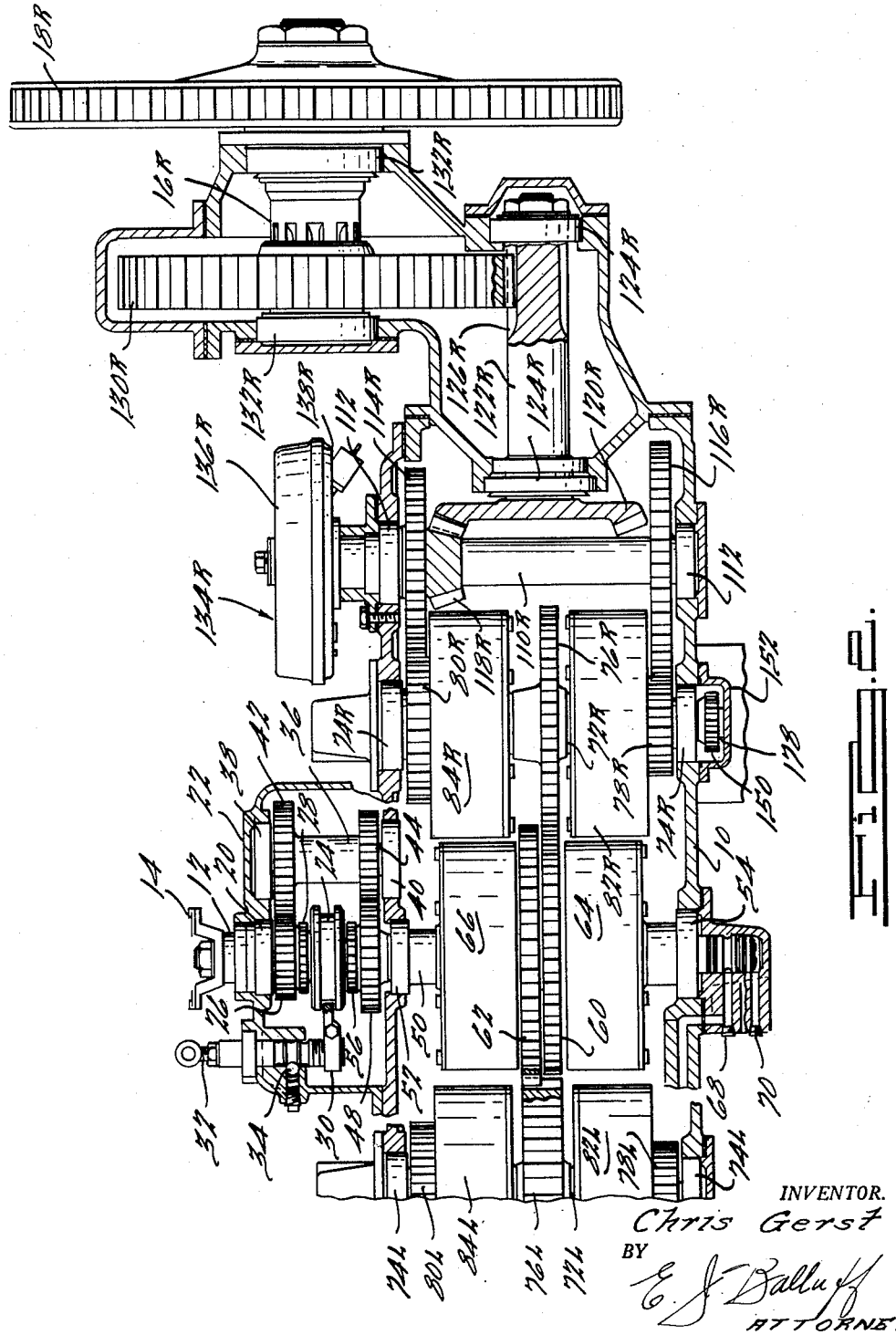
Fig. 3 is an elevational view with parts broken away of a power-operated winch adapted to be driven from the transmission and taken on line 3—3 of Fig. 4.

One of the countershafts, the countershaft 72R illustrated herein, projects from the transmission housing 10 and has a gear 150 secured thereon outwardly from the bearing 74R. A power-operated winch is adapted to be mounted on the transmission housing and the countershaft 72R and the gear 150 secured thereon provide a power take-off arrangement for driving the winch from the transmission. The winch includes a housing 152 suitably secured to the transmission housing 10 and the gear 150 is located within an upper portion of the winch housing 152. The winch includes a drum or spool 154 rotatably mounted on a shaft 156 journaled at one end in a bearing 158 located within a fixed annular portion 160 of the housing 152. The other end of shaft 156 is journaled in bearings 162 and 164. The spool 154 includes annular end walls 166 and 168 with the end 166 opposed to and spaced from the housing portion 160. A worm wheel 170 is splined onto one end of shaft 156 and is meshed with a worm 172 journaled in housing 152 by bearings 174. A gear 176 is slidably splined on one end of worm shaft 178 and has a hub 180 integral with or connected to gear 176. A yoke 182 is connected to a shifting lever 184 and engages in a groove formed on hub 180 so that, when the lever 184 is moved in one direction, the yoke 182 will shift gear 176 axially along worm shaft 178 so that the teeth of gear 176 will mesh with the teeth of gear 150 secured on countershaft 72R. The gear 176 is shown in its released position in Fig. 3 and a spring-pressed ball 186 cooperates with the shifting lever 184 to determine the engaged and released positions of the gear 176. When the gear 176 is engaged, gear 176 and worm shaft 178 will be driven with countershaft 72R and the worm 172 and worm wheel 170 will drive shaft 156 at a reduced speed if either the forward or reverse clutch 64 or 66 is engaged, and the clutch 24 is shifted to drive clutch shaft 50 either directly by engagement of clutch 24 with splines 56 or at a reduced speed ratio by engagement of clutch 24 with splines 28. The shiftable gear 176 and its hub 180 thus provide a clutch means between countershaft 72R and shaft 156.

Figure 4:
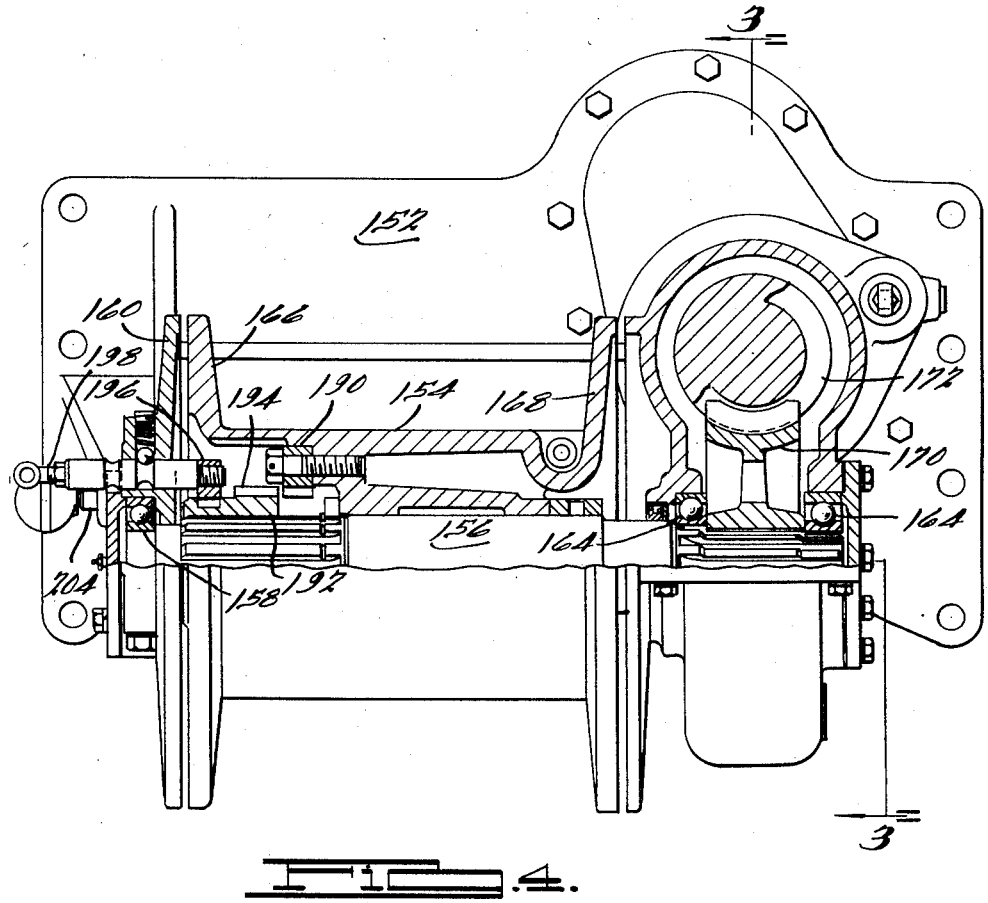
Fig. 4 is an end elevational view of the winch with parts broken away.
Figure 5:
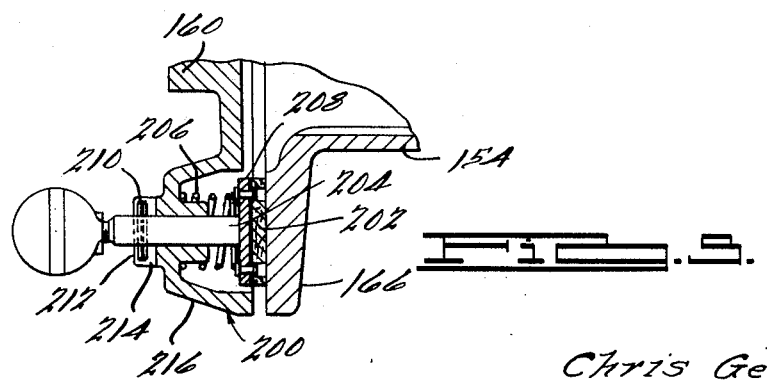
Fig. 5 is a fragmentary sectional view illustrating a drag brake for use with the winch.
Figure 8:
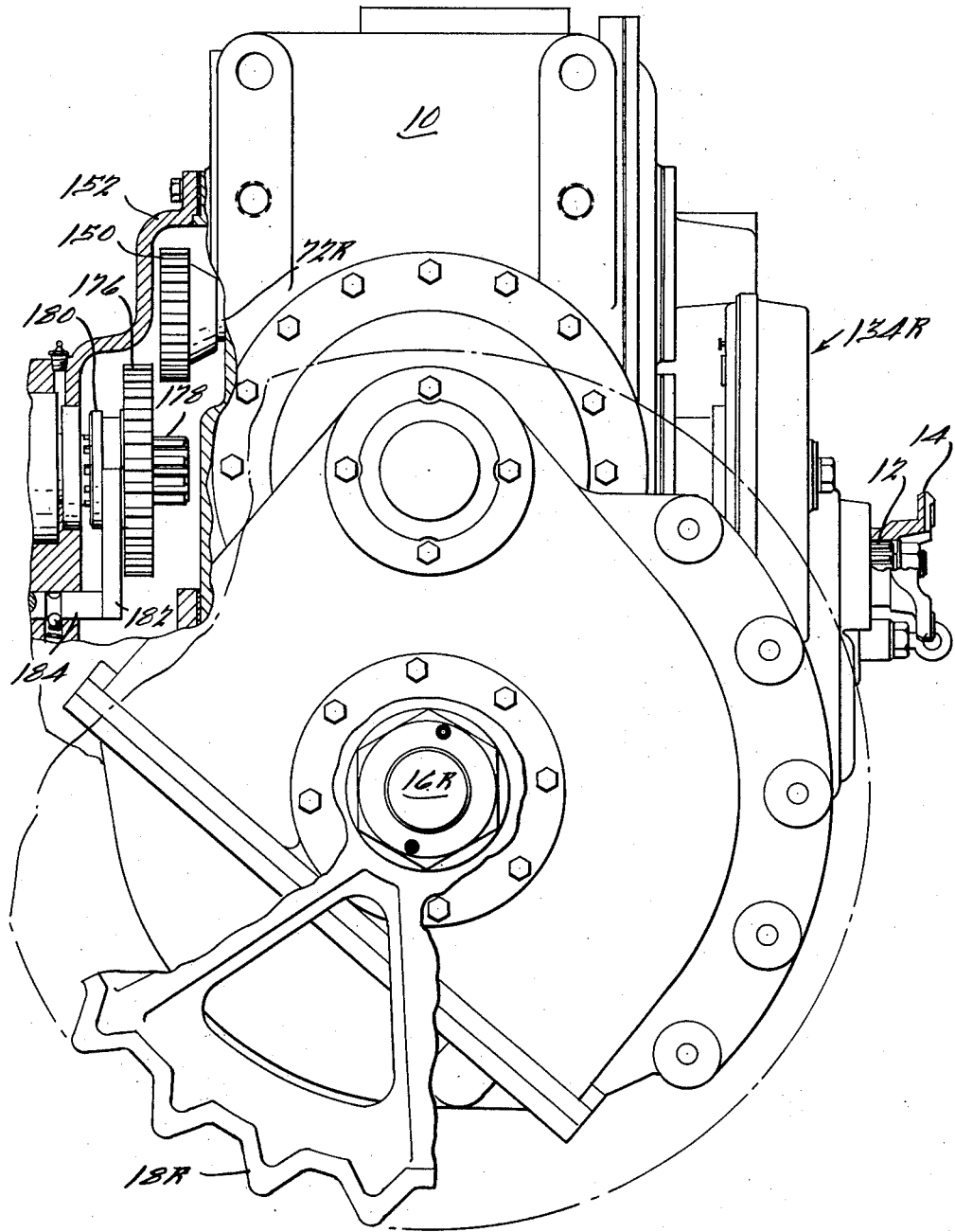

An internal gear 190 is secured to the hub of spool 154 and a gear 192 is slidably splined onto the end of shaft 156 and has teeth 194 adapted to be meshed with the teeth of internal gear 190 so as to drive spool 154 with shaft 156. A shifting yoke 196 secured to gear 192 is connected to a shifting lever 198 which may be shifted axially to mesh gears 192 and 190. The clutch lever 198 is in its released position in Fig. 4 and when in such position the spool 154 will not be driven even though shaft 156 is driven through the transmission arrangement described. A drag brake 200 for the spool 154 is illustrated in Fig. 5 as comprising friction or brake lining 202 secured on a rod 204 and engageable with the end wall 166 of spool 154 under the influence of spring 206 which reacts between the head 208 on rod 204 and a portion of the fixed flange 160. When the brake 200 is in its engaged position shown, it will provide frictional resistance or drag against the spool so as to prevent free spooling thereof. The brake may be released by pulling outwardly on rod 204 and then turning the rod 90° so that a pin 210 secured to the rod will engage the end faces 212 of a slot 214 formed in the boss 216 through which the rod projects.

The teeth of the worm 172 and worm wheel 170 are of the nonreversible type so as to automatically lock the spool 154 against reverse rotation under the force of a load connected to the cable which is wound onto the spool 154. In other words, the teeth of the worm and worm wheel are designed so that a drive cannot be transmitted from drum 154 and shaft 156 through the worm and worm wheel to the input shaft of the winch.

It will be seen that with the transmission described herein the main clutch shaft 50 may be driven at either of two speeds from the input shaft and the two countershafts 72R and 72L may be driven in either direction by engagement of either the forward drive clutch 64 or the reverse drive clutch 66. The countershaft 72R which may be clutched to the input shaft 178 of the winch transmission is therefore adapted to be driven in either direction at two different speeds and the winch may be operated regardless of the condition of the high speed clutches 84R or low speed clutches 82R. Furthermore, one of the clutches associated with each countershaft may be engaged independently of the clutches on the other countershaft so that one of the output shafts 16R and 16L may be driven independently of the other output shaft.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A transmission comprising an input shaft, a clutch shaft aligned with said input shaft, gearing for driving said clutch shaft from said input shaft, a forward drive gear and a reverse drive gear rotatable on said clutch shaft, a forward drive clutch on said clutch shaft and adapted when engaged to couple said forward drive gear to said clutch shaft, a reverse drive clutch on said clutch shaft and adapted when engaged to couple said reverse drive gear to said clutch shaft, a pair of countershafts disposed parallel to said clutch shaft and each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a high speed clutch associated with each high speed gear and its countershaft and adapted when engaged to provide a driving connection therebetween, a low speed clutch associated with each low speed gear and its countershaft and adapted when engaged to provide a driving connection therebetween, a pair of output shafts, and gearing drivingly connecting each output shaft with the high and low speed gears on one of said countershafts.

2. A steering axle and transmission comprising an input shaft, a clutch shaft aligned with said input shaft, multispeed gearing and a clutch therefor between said clutch shaft and said input shaft for driving said clutch shaft at a selected speed from said input shaft, a forward drive gear and a reverse drive gear rotatable on said clutch shaft, a forward drive clutch on said clutch shaft and adapted when engaged to couple said forward drive gear to said clutch shaft, a reverse drive clutch on said clutch shaft and adapted when engaged to couple said reverse drive gear to said clutch shaft, a pair of countershafts disposed parallel to said clutch shaft and each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a high speed clutch on each countershaft and adapted when engaged to provide a driving connection between its countershaft and the high speed gear thereon, a low speed clutch on each countershaft and adapted when engaged to provide a driving connection between its countershaft and the low speed gear thereon, a pair of output shafts, and gearing drivingly connecting each output shaft with the high and low speed gears on one of said countershafts.

3. In a transmission, an input shaft, a clutch shaft aligned with said input shaft, multispeed gearing and selectively operable clutch means therefor between said input and clutch shafts for driving said clutch shaft from said input shaft at a selected speed, a forward drive gear and a reverse drive gear rotatable on said clutch shaft, a forward drive clutch on said clutch shaft and adapted when engaged to couple said forward drive gear to said clutch shaft, a reverse drive clutch on said clutch shaft and adapted when engaged to couple said reverse drive gear to said clutch shaft, a pair of countershafts each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a pair of output shafts, gearing drivingly connecting each output shaft with the high and low speed gears on one of said countershafts, a high speed clutch associated with each high speed gear and its countershaft and adapted when engaged to provide a driving connection therebetween, and a low speed clutch associated with each low speed gear and its countershaft and adapted when engaged to provide a driving connection therebetween.

4. A steering axle and transmission comprising an input shaft, a clutch shaft aligned with said input shaft, gearing for driving said clutch shaft from said input shaft, a forward drive gear and a reverse drive gear rotatable on said clutch shaft, a forward drive clutch on said clutch shaft and adapted when engaged to couple said forward drive gear to said clutch shaft, a reverse drive clutch on said clutch shaft and adapted when engaged to couple said reverse drive gear to said clutch shaft, a pair of countershafts disposed parallel to said clutch shaft and each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a second pair of shafts each having a pair of gears secured thereon meshed with the high and low speed gears on one of said countershafts, a high speed clutch associated with each high speed gear and its countershaft and adapted when engaged to provide a driving connection therebetween, a low speed clutch associated with each low speed gear and its countershaft and adapted when engaged to provide a driving connection therebetween, a pair of output shafts, and gearing drivingly connecting each output shaft with one of said second pair of shafts.

5. A transmission comprising an input shaft, a clutch shaft aligned with said input shaft, multispeed gearing and a clutch therefor for driving said clutch shaft from said input shaft at a selected speed, a forward drive gear and a reverse drive gear rotatable on said clutch shaft, a forward drive clutch on said clutch shaft and adapted when engaged to couple said forward drive gear to said clutch shaft, a reverse drive clutch on said clutch shaft and adapted when engaged to couple said reverse drive gear to said clutch shaft, a pair of countershafts disposed parallel to said clutch shaft and each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a second pair of shafts each having a pair of gears secured thereon, one of said pair of gears on each of said latter shafts being meshed with the high speed gear on one of said countershafts and the other gear of said pair being meshed with the low speed gear on said one countershaft, a high speed clutch associated with each high speed gear and its countershaft and adapted when engaged to provide a driving connection therebetween, a low speed clutch associated with each low speed gear and its countershaft and adapted when engaged to provide a driving connection therebetween, a pair of output shafts, and gearing drivingly connecting each output shaft with one of said second pair of shafts.

6. A transmission comprising an input shaft, a clutch shaft aligned with and driven from said input shaft, a forward drive gear and a reverse drive gear rotatable on said clutch shaft, a forward drive clutch associated with said clutch shaft and said forward drive gear and adapted when engaged to provide a driving connection therebetween, a reverse drive clutch associated with said clutch shaft and said reverse drive gear and adapted when engaged to provide a driving connection therebetween, a pair of countershafts each having a driven gear secured thereon, one of said driven gears being meshed with said forward drive gear and the other driven gear being meshed with said reverse drive gear, said driven gears being meshed with each other, a high speed gear and a low speed gear rotatable on each of said countershafts, a high speed clutch associated with each high speed gear and its countershaft and adapted when engaged to provide a driving connection therebetween, a low speed clutch associated with each low speed gear and its countershaft and adapted when engaged to provide a driving connection therebetween, a pair of output shafts disposed transverse to said input shaft, and gearing drivingly connecting each output shaft with the high and low speed gears on one of said countershafts.

7. A transmission according to claim 6, including multispeed gearing connecting said clutch shaft to said input shaft and a clutch associated with said gearing for driving said clutch shaft at different speeds from said input shaft.

8. A transmission according to claim 6, including a housing for said transmission and wherein one of said countershafts has one end thereof projecting from said housing, a power-driven winch mounted on said housing, and clutch means for providing a driving connection between said one countershaft and said winch.

9. In a transmission comprising a transmission housing and an input shaft extending into said housing, a clutch shaft aligned with said input shaft, selectively operable multispeed gearing between said input shaft and said clutch shaft, a pair of countershafts disposed parallel to said clutch shaft and selectively operable forward and reverse clutch means between said clutch shaft and said countershafts for driving said countershafts from said clutch shaft in either direction at a selected speed, a pair of output shafts, and selectively operable gearing and clutch means for drivingly connecting each output shaft with one of said countershafts, a power operated winch mounted on said housing and including an input shaft, one of said countershafts having one end thereof projecting from said housing toward said winch input shaft, and a clutch associated with said one countershaft and said winch input shaft and adapted when engaged to couple the latter to said one countershaft for driving said winch from said transmission in either direction at a selected speed.

10. In a transmission including an input shaft and a pair of output shafts, a countershaft between each output shaft and said input shaft, selectively operable multispeed gearing and forward and reverse clutch means between said input shaft and each countershaft for driving said countershafts in either direction at a selected speed, multispeed gearing and selectively operable clutch means controlling the same for driving each output shaft from one of said countershafts, gear means on one end of one of said countershafts, a power operated winch having an input shaft and a clutch operably disposed between said one end of said one countershaft and said winch input shaft for driving the latter from said one countershaft, said winch including a drive shaft and a spool rotatable thereon and speed reduction gearing of the nonreversible type connecting said drive shaft and said winch input shaft, and a clutch operably disposed between said drive shaft and said spool for coupling said spool to said drive shaft.

References Cited in the file of this patent

UNITED STATES PATENTS

| | | |
|---|---|---|
| 2,288,631 | Linderman | July 7, 1942 |
| 2,304,032 | Schmitter | Dec. 1, 1942 |
| 2,443,313 | Gerst | June 15, 1948 |
| 2,553,376 | Le Tourneau | May 15, 1951 |
| 2,712,245 | Lee | July 5, 1955 |